(12) United States Patent
Hoki et al.

(10) Patent No.: US 12,496,919 B2
(45) Date of Patent: Dec. 16, 2025

(54) SUPPORT SERVER, DISASTER SUPPORT SYSTEM, AND STORAGE MEDIUM

(71) Applicant: TOYOTA JIDOSHA KABUSHIKI KAISHA, Toyota (JP)

(72) Inventors: Yusuke Hoki, Mishima (JP); Koseki Sugiyama, Sunto-gun (JP); Kumiko Katsumata, Susono (JP); Rie Yayabe, Sunto-gun (JP); Shin Sakurada, Toyota (JP); Tomio Yamanaka, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 776 days.

(21) Appl. No.: 17/850,332

(22) Filed: Jun. 27, 2022

(65) Prior Publication Data

US 2023/0021474 A1  Jan. 26, 2023

(30) Foreign Application Priority Data

Jul. 16, 2021 (JP) .................. 2021-118210

(51) Int. Cl.
 *B60L 53/20* (2019.01)
 *B60L 53/62* (2019.01)
 *B60L 53/63* (2019.01)

(52) U.S. Cl.
 CPC .............. *B60L 53/20* (2019.02); *B60L 53/62* (2019.02); *B60L 53/63* (2019.02)

(58) Field of Classification Search
 CPC ........... B60L 53/20; B60L 53/62; B60L 53/63
 See application file for complete search history.

(56) References Cited

U.S. PATENT DOCUMENTS

2021/0295619 A1*  9/2021  Tsuchiya ................ B60L 53/62
2022/0311271 A1*  9/2022  Kitamoto .............. H02J 7/0048

FOREIGN PATENT DOCUMENTS

JP   2017112806 A  *  6/2017

OTHER PUBLICATIONS

Machine translation of JP-2017112806-A. (Year: 2017).*

* cited by examiner

*Primary Examiner* — Drew A Dunn
*Assistant Examiner* — Pamela J Jeppson
(74) *Attorney, Agent, or Firm* — Oliff PLC (57) ABSTRACT

A support server includes a controlling portion configured to execute the followings: acquiring respective pieces of vehicle information on a plurality of vehicles present in a power outage area; specifying a power supply vehicle by which power supply is performable, from among the vehicles based on the respective pieces of vehicle information on the vehicles; and outputting, to the power supply vehicle, power supply information indicating that power supply is performable by the power supply vehicle.

6 Claims, 9 Drawing Sheets

SUPPORT SERVER, DISASTER SUPPORT SYSTEM, AND STORAGE MEDIUM

CROSS-REFERENCE TO RELATED APPLICATION

This application claims priority to Japanese Patent Application No. 2021-118210 filed on Jul. 16, 2021, incorporated herein by reference in its entirety.

BACKGROUND

1. Technical Field

This disclosure relates to a support server, a disaster support system, and a storage medium.

2. Description of Related Art

Japanese Unexamined Patent Application Publication No. 2017-112806 (JP 2017-112806 A) describes a technology in which, at the time of a power shortage due to a disaster, electric power is appropriately supplied to a plurality of emergency facilities by use of power supply vehicles. In this technology, an emergency facility to which each of the power supply vehicles performs power supply is determined based on respective pieces of emergency facility information on the emergency facilities and vehicle information on the each of the power supply vehicles, and a user of the each of the power supply vehicles is notified of the emergency facility determined as a power supply destination.

SUMMARY

However, even in a case where an occupant of a vehicle is notified of an emergency facility like JP 2017-112806 A, the occupant may not grasp that the vehicle has a power supply function, and the occupant cannot perform a rescue operation in case of a disaster.

This disclosure is accomplished in view of the above problem, and an object of this disclosure is to provide a support server, a disaster support system, and a storage medium each of which allows an occupant to grasp that his or her vehicle has a power supply function.

A support server according to this disclosure includes a processor configured to execute the followings: acquiring respective pieces of vehicle information on a plurality of vehicles present in a power outage area; specifying a power supply vehicle by which power supply is performable, from among the vehicles based on the respective pieces of vehicle information on the vehicles; and outputting, to the power supply vehicle, power supply information indicating that power supply is performable by the power supply vehicle.

Further, a disaster support system according to this disclosure includes a plurality of vehicles, and a support server communicable via a network. The support server includes a processor configured to execute the followings: acquiring respective pieces of vehicle information on the vehicles present in a power outage area, specifying a power supply vehicle by which power supply is performable, from among the vehicles based on the respective pieces of vehicle information on the vehicles, and outputting, to the power supply vehicle, power supply information indicating that power supply is performable by the power supply vehicle.

Further, a storage medium according to the present disclosure stores a program causing a support server to execute the followings: acquiring respective pieces of vehicle information on a plurality of vehicles present in a power outage area; specifying a power supply vehicle by which power supply is performable, from among the vehicles based on the respective pieces of vehicle information on the vehicles; and outputting, to the power supply vehicle, power supply information indicating that power supply is performable by the power supply vehicle.

This disclosure yields an effect that an occupant of a vehicle can grasp that the vehicle has a power supply function.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The following describes a support server, a disaster support system, and a program according to an embodiment of this disclosure with reference to the drawings. Note that this disclosure is not limited to the following embodiment. Further, in the following description, the same element has the same reference sign.

Schematic Configuration of Disaster Support System

Figure 1:
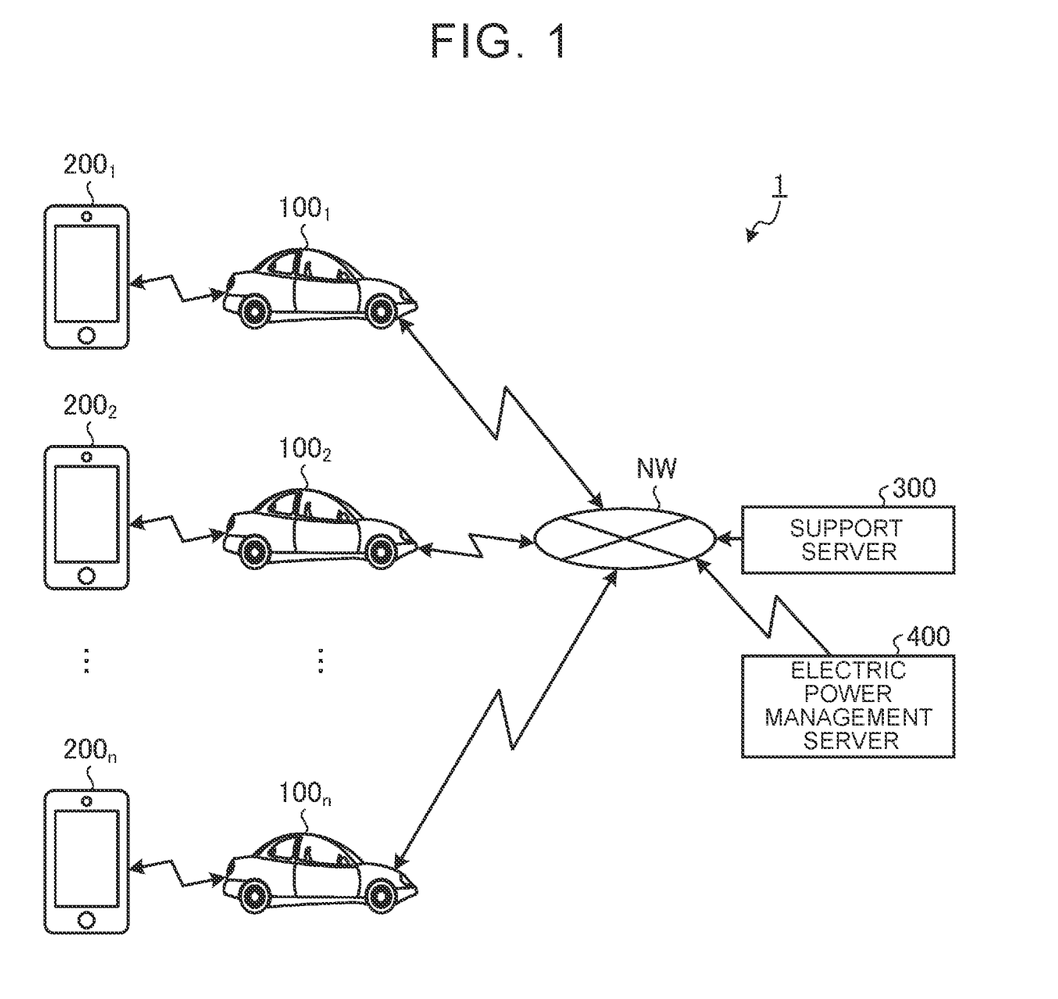
FIG. 1 is a view illustrating a schematic configuration of a disaster support system according to one embodiment.

FIG. 1 is a view illustrating a schematic configuration of a disaster support system according to one embodiment. In a disaster support system 1 illustrated in FIG. 1, a plurality of vehicles $100_1$ to $100_n$ (n=an integer of 3 or more) (hereinafter, in a case where any of the vehicles $100_1$ to $100_n$ is mentioned, it is merely described as a "vehicle 100"), a plurality of communications devices $200_1$ to $200_n$ provided such that the communications devices $200_1$ to $200_n$ are respectively associated with the vehicles $100_1$ to $100_n$ (hereinafter, in a case where any of the communications devices $200_1$ to $200_n$ is mentioned, it is merely described as a "communications device 200"), a support server 300, and an electric power management server 400. The support server 300 is communicable with the vehicle 100, the communications device 200, and the electric power management server 400 via a network NW. The electric power management server 400 is communicable with the support server 300 and the communications device 200 via the network NW. The network NW is constituted by an Internet network, a mobile phone network, or the like, for example.

The vehicle 100 is achieved by use of any of a hybrid electric vehicle (HEV), a plug-in hybrid electric vehicle (PHEV), a fuel cell electric vehicle (FCEV), and a battery electric vehicle (BEV). Note that a detailed configuration of the vehicle 100 will be described later.

The communications device 200 can communicate with the vehicle 100 in accordance with a predetermined communications standard and can communicate with the support server 300 and the electric power management server 400 via the network NW. Here, the predetermined communications standard is at least either one of Bluetooth (registered trademark) and Wi-Fi (registered trademark). The communications device 200 is achieved by use of a mobile phone, a tablet-type communication terminal, or the like, for example.

The support server 300 can communicate with the vehicles 100, the communications devices 200, and the electric power management server 400 via the network NW and outputs information necessary to support users at the time of a disaster. Note that a detailed configuration of the support server 300 will be described later.

The electric power management server 400 manages an electric-power supply state in each predetermined area via the network NW. For example, the electric power management server 400 manages area information on an area where power outage occurs, an electric-power supply state in the area, and so on.

Functional Configuration of Vehicle

Figure 2:
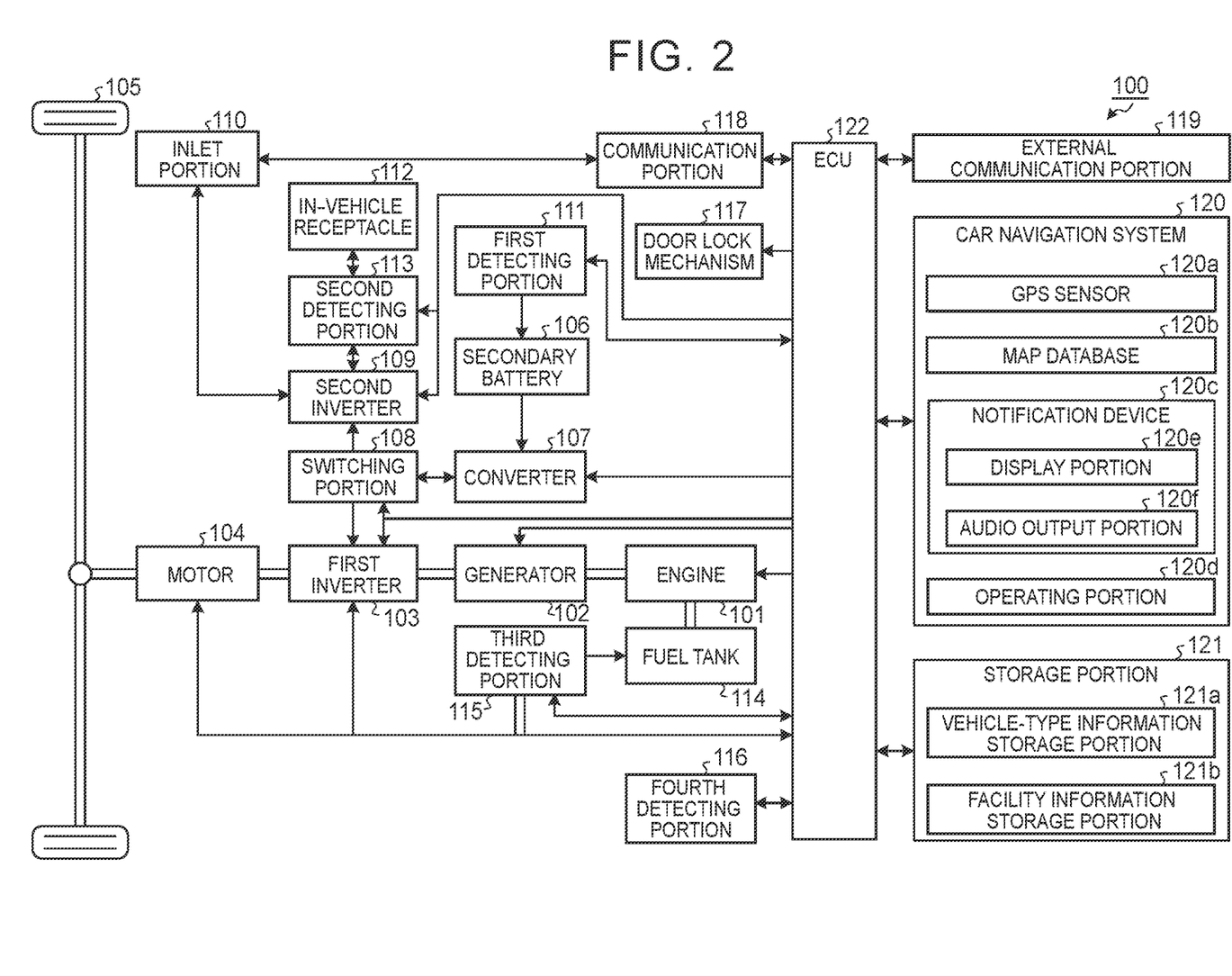
FIG. 2 is a block diagram illustrating a functional configuration of a vehicle according to one embodiment.

Next will be described a detailed functional configuration of the vehicle 100. FIG. 2 is a block diagram illustrating the functional configuration of the vehicle 100. As illustrated in FIG. 2, the vehicle 100 includes an engine 101, a generator 102, a first inverter 103, a motor 104, driving wheels 105, a secondary battery 106, a converter 107, a switching portion 108, a second inverter 109, an inlet portion 110, a first detecting portion 111, an in-vehicle receptacle 112, a second detecting portion 113, a fuel tank 114, a third detecting portion 115, a fourth detecting portion 116, a door lock mechanism 117, a communication portion 118, an external communication portion 119, a car navigation system 120, a storage portion 121, and an electronic control unit (ECU) 122.

The engine 101 is constituted by a well-known internal combustion engine and outputs power by use of fuel accumulated in the fuel tank 114. The engine 101 is driven under the control of the ECU 122. The power output from the engine 101 drives the generator 102.

The generator 102 is electrically connected to the motor 104 via the first inverter 103. The generator 102 supplies generated alternating current power to the secondary battery 106 via the switching portion 108 and the converter 107 under the control of the ECU 122. The generator 102 is constituted by a power-generation motor generator having a motor function in addition to a power generation function.

The first inverter 103 converts discharge electric power (direct current power) supplied from the secondary battery 106 via the switching portion 108 and the converter 107 into alternating current power and supplies the alternating current power to the motor 104, under the control of the ECU 122. Further, the first inverter 103 converts alternating current power generated by the motor 104 to direct current power at the time of regenerative braking of the vehicle 100 and supplies the direct current power to the secondary battery 106 via the switching portion 108 and the converter 107 under the control of the ECU 122. The first inverter 103 is constituted by, for example, a three-phase inverter circuit or the like including a bridge circuit including a three-phase switching element.

The motor 104 is driven by alternating current power supplied from the first inverter 103 at the time of acceleration of the vehicle 100, under the control of the ECU 122. The power output from the motor 104 drives the driving wheels 105. Further, the motor 104 functions as a generator configured to generate electric power by external force transmitted from the driving wheels 105 at the time of braking of the vehicle 100 under the control of the ECU 122 and supplies the electric power thus generated to the secondary battery 106 from the first inverter 103 via the switching portion 108 and the converter 107. The motor 104 is constituted by a driving motor generator having a power generation function in addition to a motor function.

The secondary battery 106 is constituted by a chargeable-dischargeable storage battery such as a nickel-metal hydride battery or a lithium ion battery, or a storage element such as an electric double layer capacitor, for example. The secondary battery 106 can be charged and discharged by the converter 107, and high-voltage direct current power is stored in the secondary battery 106.

A first end of the converter 107 is electrically connected to the secondary battery 106, and a second end of the converter 107 is electrically connected to either one of the first inverter 103 and the second inverter 109 via the switching portion 108. The converter 107 charges and discharges the secondary battery 106 under the control of the ECU 122. More specifically, in a case where the converter 107 charges the secondary battery 106, the converter 107 decreases the voltage of direct current power externally supplied via the second inverter 109, the inlet portion 110, and the switching portion 108 to a predetermined voltage and supplies, to the secondary battery 106, a resultant charge current with the decreased voltage. In the meantime, in a case where the converter 107 discharges the secondary battery 106, the converter 107 increases the voltage of direct current power from the secondary battery 106 and supplies a resultant discharge current with the increased voltage to the first inverter 103 via the switching portion 108.

A first end of the switching portion 108 is electrically connected to the converter 107, and a second end of the switching portion 108 is electrically connected to either one of the first inverter 103 and the second inverter 109. The switching portion 108 electrically connects the converter 107 to either one of the first inverter 103 and the second inverter 109 under the control of the ECU 122. The switching portion 108 is constituted by a mechanical relay, a semiconductor switch, or the like.

A first end of the second inverter 109 is electrically connected to the switching portion 108, and a second end of the second inverter 109 is electrically connected to the inlet portion 110 or the in-vehicle receptacle 112. The second inverter 109 converts discharge electric power (direct current power) supplied from the secondary battery 106 via the switching portion 108 and the converter 107 into alternating current power and supplies the alternating current power to the inlet portion 110 under the control of the ECU 122. More specifically, the second inverter 109 supplies alternating current power to outside via the inlet portion 110 and a charge-discharge wire (not illustrated) under the control of the ECU 122. The second inverter 109 is constituted by a single-phase inverter circuit or the like so as to correspond to the type of electric power to be used outside.

A first end of the inlet portion 110 is electrically connected to the second inverter 109. The charge-discharge wire (not illustrated) is detachably connected to the inlet portion 110. The inlet portion 110 supplies alternating current power supplied from outside to the second inverter 109 via the charge-discharge wire and outputs various pieces of information including a control signal or the like input from outside to the communication portion 118. Further, the inlet portion 110 supplies alternating current power supplied from the second inverter 109 to outside via the charge-discharge wire and outputs, to outside, various pieces of information including a control signal or the like input from the ECU 122 via the communication portion 118.

The first detecting portion 111 detects a state of charge (SOC), a temperature, a state of health (SOH), a voltage value, and a current value of the secondary battery 106 and outputs the detection results to the ECU 122. The first detecting portion 111 is constituted by an ammeter, a voltmeter, a temperature sensor, and so on.

The in-vehicle receptacle 112 is electrically connected to the second inverter 109. A power plug of a general electric appliance is connectable to the in-vehicle receptacle 112, and the in-vehicle receptacle 112 supplies alternating current power supplied from the second inverter 109 to an electric appliance the power plug of which is connected to the in-vehicle receptacle 112.

The second detecting portion 113 is provided between the in-vehicle receptacle 112 and the second inverter 109. The second detecting portion 113 detects at least one of power consumption and a current value of electric equipment connected to the in-vehicle receptacle 112 and outputs the detection result to the ECU 122. The second detecting portion 113 is constituted by a wattmeter, an ammeter, and a voltmeter, and so on.

Fuel to be supplied to the engine 101 is accumulated in the fuel tank 114. Here, the fuel is fossil fuel such as gasoline. Note that, in a case where the vehicle 100 is an FCEV, hydrogen fuel is accumulated in the fuel tank 114.

The third detecting portion 115 detects a residual amount of the fuel accumulated in the fuel tank 114 and outputs the detection result to the ECU 122. The third detecting portion 115 is constituted by a fuel gauge or the like.

The fourth detecting portion 116 detects status information on the vehicle 100 and outputs the detection result to the ECU 122. Here, the status information is an acceleration, an inclination angle, a speed, and so on of the vehicle 100. The fourth detecting portion 116 is constituted by an acceleration sensor, a velocity sensor, a gyro sensor, and so on.

The door lock mechanism 117 opens and closes a door provided in the vehicle 100 under the control of the ECU 122.

The communication portion 118 receives a control signal including various pieces of information input from outside via the inlet portion 110 and outputs the control signal thus received to the ECU 122. Further, the communication portion 118 outputs a control signal including CAN data or the like input from the ECU 122 to the inlet portion 110. The communication portion 118 is constituted by a communications module or the like.

The external communication portion 119 transmits various pieces of information input from the ECU 122 to the communications device 200 in accordance with a predetermined communications standard under the control of the ECU 122. Further, the external communication portion 119 outputs various pieces of information received from the communications device 200 to the ECU 122. Here, the predetermined communications standard is at least one of Wi-Fi (registered trademark) and Bluetooth (registered trademark). The external communication portion 119 is constituted by a wireless communications module or the like.

The car navigation system 120 includes a global positioning system (GPS) sensor 120a, a map database 120b, a notification device 120c, and an operating portion 120d.

The GPS sensor 120a receives signals from a plurality of GPS satellites or transmitting antennas and calculates position information on the position (longitude and latitude) of the vehicle 100 based on the signals thus received. The GPS sensor 120a is constituted by a GPS reception sensor or the like. Note that, in Embodiment 1, a plurality of GPS sensors 120a may be provided to improve direction accuracy of the vehicle 100.

In the map database 120b, various pieces of map information are stored. The map database 120b is constituted by a storage medium such as a hard disk drive (HDD) or a solid state drive (SSD).

The notification device 120c includes a display portion 120e on which an image, a map, a video, and text information are displayed, and an audio output portion 120f configured to output sound such as voice or warning sound. The display portion 120e is constituted by use of a display such as a liquid crystal display or an organic electroluminescence (EL) display. The audio output portion 120f is constituted by a speaker or the like.

The operating portion 120d receives operations input by an occupant and outputs signals corresponding to various operation contents thus received to the ECU 122. The operating portion 120d is achieved by a touchscreen, a button, a switch, a jog dial, or the like.

The car navigation system 120 configured as such superimposes position information on a present position of the vehicle 100 that is acquired by the GPS sensor 120a on a map corresponding to map data stored in the map database 120b. Hereby, the car navigation system 120 notifies the occupant of information including a road on which the vehicle 100 is currently traveling, a travel route to a destination, and so on, by use of the display portion 120e and the audio output portion 120f.

In the storage portion 121, various pieces of information on the vehicle 100 is stored. In the storage portion 121, CAN data on the vehicle 100 that is input from the ECU 122, various pieces of data under processing by the ECU 122, and so on are stored. The storage portion 121 includes a vehicle-type information storage portion 121a in which vehicle-type information on the vehicle 100 is stored, and a program storage portion 121b in which various programs to be executed by the vehicle 100 are stored. Here, the vehicle-type information includes a vehicle type of the vehicle 100, identification information based on which the vehicle 100 is identified, a model year of the vehicle 100, information on whether or not power generation is performed, information indicative of any of EV, HV, PHV, and FCEV, and so on. The storage portion 121 is constituted by a DRAM, a ROM, a flash memory, an SSD, or the like.

The ECU 122 is constituted by use of a memory and a processor including hardware such as a central processing unit (CPU). The ECU 122 controls operations of constituent portions constituting the vehicle 100.

Functional Configuration of Support Server

Figure 3:
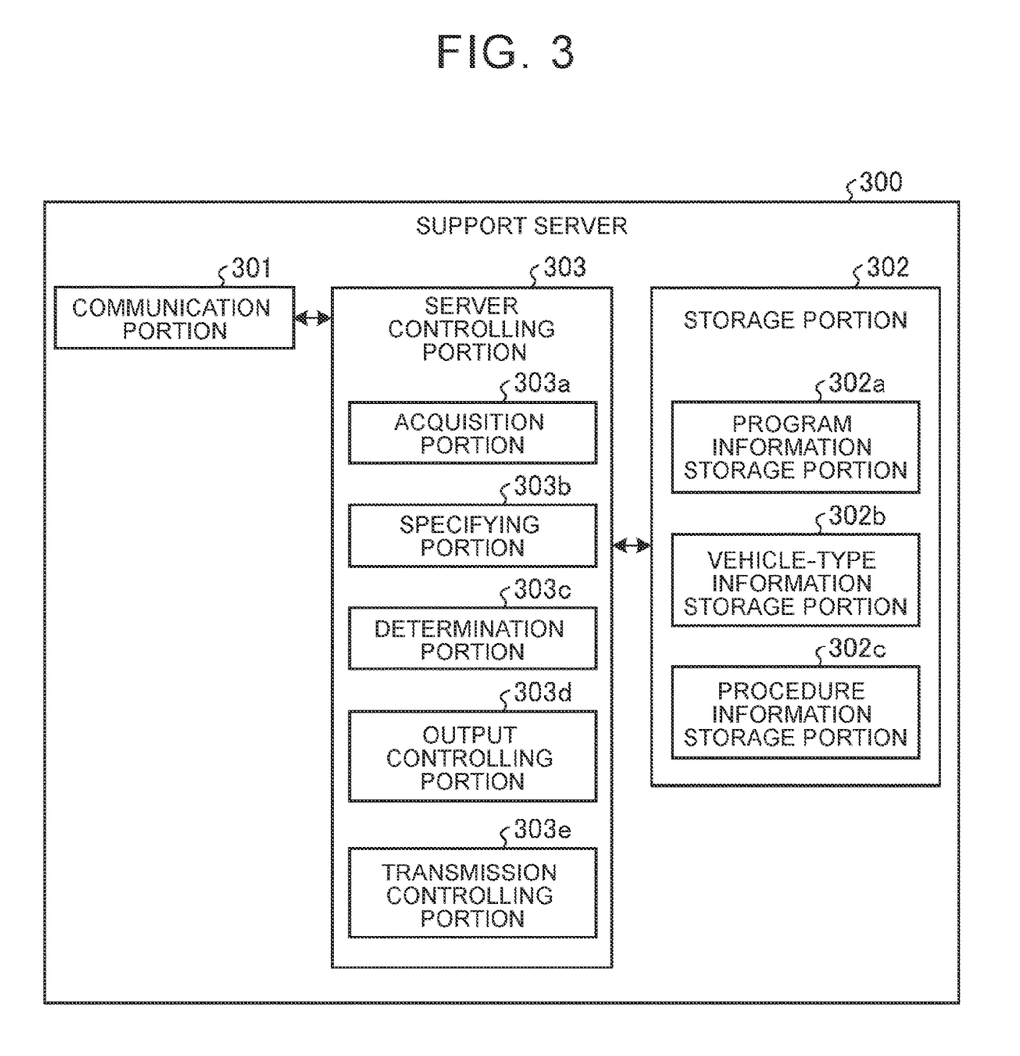
FIG. 3 is a block diagram illustrating a functional configuration of a support server according to one embodiment.

Next will be described a functional configuration of the support server 300. FIG. 3 is a block diagram illustrating the functional configuration of the support server 300. The support server 300 illustrated in FIG. 3 includes a communication portion 301, a storage portion 302, and a controlling portion 303.

The communication portion 301 receives various pieces of information from the vehicle 100 or the communications device 200 via the network NW and also transmits various pieces of information to the vehicle 100 or the communications device 200 via the network NW, under the control of the controlling portion 303. The communication portion 301 is constituted by a communications module or the like that can transmit and receive various pieces of information.

In the storage portion 302, various pieces of information on the support server 300 are stored. The storage portion 302 includes a program storage portion 302*a* in which various programs to be executed by the support server 300 are stored, a vehicle-type information storage portion 302*b* in which vehicle-type information is stored, and a procedure information storage portion 302*c* in which the procedure of a power supply method is stored. The storage portion 302 is constituted by a DRAM, a ROM, a flash memory, an HDD, an SSD, or the like.

The controlling portion 303 controls constituent portions constituting the support server 300. The controlling portion 303 is constituted by use of a memory and a processor including hardware such as a CPU. The controlling portion 303 includes an acquisition portion 303*a*, a specifying portion 303*b*, an output controlling portion 303*d*, and a transmission controlling portion 303*e*.

The acquisition portion 303*a* acquires power outage information from the electric power management server 400 via the network NW and the communication portion 301. Further, the acquisition portion 303*a* acquires, based on the power outage information, respective pieces of position information, respective pieces of vehicle information, and respective pieces of communication establishment information from a plurality of vehicles 100 present in a power outage area via the network NW and the communication portion 301. The communication establishment information is information indicative of a communication establishment state between the vehicle 100 and the communications device 200 associated with the vehicle 100.

The specifying portion 303*b* specifies a power-suppliable vehicle 100 (hereinafter referred to as a "power supply vehicle 100A") from among the vehicles 100 based on the respective pieces of vehicle information on the vehicles 100 that are acquired by the acquisition portion 303*a*.

Based on the respective pieces of communication establishment information on the vehicles 100 that are acquired by the acquisition portion 303*a*, the determination portion 303*c* determines whether or not communication is established between the power supply vehicle 100A and the communications device 200 associated with the power supply vehicle 100A.

The output controlling portion 303*d* outputs power supply information indicating that power supply is performable by the power supply vehicle 100A and procedure information indicating the procedure of a power supply method to at least one of the power supply vehicle 100A and the communications device 200 associated with the power supply vehicle 100A via the network NW and the communication portion 301.

The transmission controlling portion 303*e* transmits the procedure information indicating the procedure of the power supply method via the network NW and the communication portion 301 in response to an operation input by an occupant of the power supply vehicle 100A.

Process of Support Server

Figure 4:
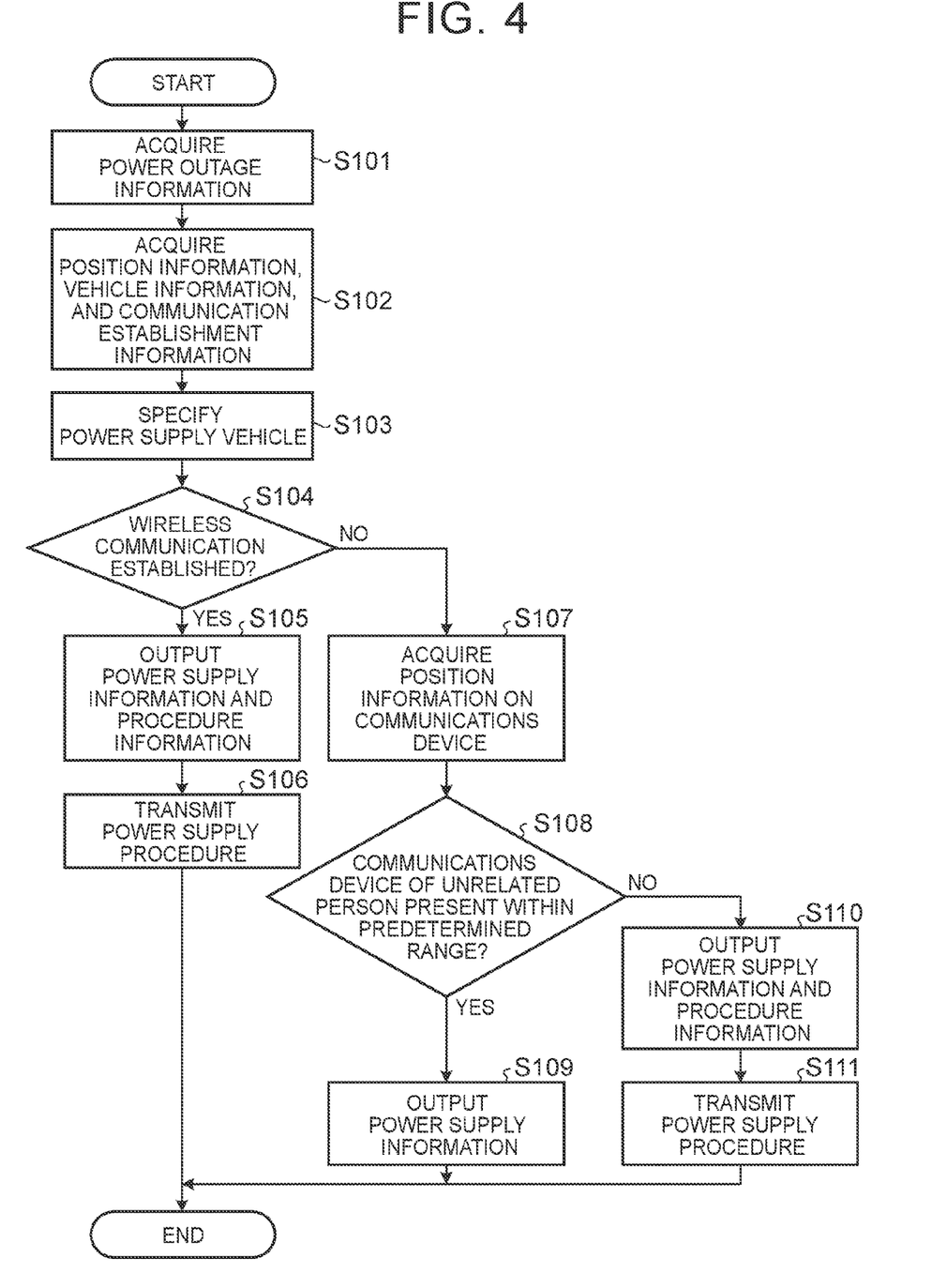
FIG. 4 is a flowchart illustrating the outline of a process to be executed by the support server according to one embodiment.

Next will be described a process to be executed by the support server 300. FIG. 4 is a flowchart illustrating the outline of the process to be executed by the support server 300.

As illustrated in FIG. 4, first, the acquisition portion 303*a* acquires power outage information from the electric power management server 400 via the network NW and the communication portion 301 (step S101). Here, the power outage information includes information on a power outage area where power outage occurs, e.g., the address of the power outage area.

Subsequently, the acquisition portion 303*a* acquires, based on the power outage information, respective pieces of position information, respective pieces of vehicle information, and respective pieces of communication establishment information from a plurality of vehicles 100 present in the power outage area via the network NW and the communication portion 301 (step S102). The communication establishment information is information indicative of a communication establishment state between the vehicle 100 and the communications device 200 associated with the vehicle 100.

After that, the specifying portion 303*b* specifies a power supply vehicle 100A by which power supply is performable, from among the vehicles 100 based on the respective pieces of vehicle information on the vehicles 100 that are acquired by the acquisition portion 303*a* (step S103).

Subsequently, based on the respective pieces of communication establishment information on the vehicles 100 that are acquired by the acquisition portion 303*a*, the determination portion 303*c* determines whether or not communication is established between the power supply vehicle 100A and the communications device 200 associated with the power supply vehicle 100A (step S104). For example, in a case where the communication standard is Bluetooth (registered trademark), the determination portion 303*c* determines whether or not the communication establishment information includes pairing information indicating that a pairing between an identifier of the communications device 200 and an identifier of the power supply vehicle 100A is established. More specifically, in a case where the communication establishment information includes the pairing information, the determination portion 303*c* determines that communication is established between the power supply vehicle 100A and the communications device 200 associated with the power supply vehicle 100A, and in a case where the communication establishment information does not include the pairing information, the determination portion 303*c* determines that communication is not established between the power supply vehicle 100A and the communications device 200 associated with the power supply vehicle 100A. In a case where the determination portion 303*c* determines that communication is established between the power supply vehicle 100A and the communications device 200 associated with the power supply vehicle 100A (step S104: Yes), the support server 300 shifts to step S105 (described later). In the meantime, in a case where the determination portion 303*c* determines that communication is not established between the power supply vehicle 100A and the communications device 200 associated with the power supply vehicle 100A (step S104: No), the support server 300 shifts to step S107 (described later).

In step S105, the output controlling portion 303*d* outputs power supply information indicating that the power supply vehicle 100A is in a power-suppliable state and procedure information indicative of the procedure of the power supply method, via the network NW and the communication portion

Figure 5:
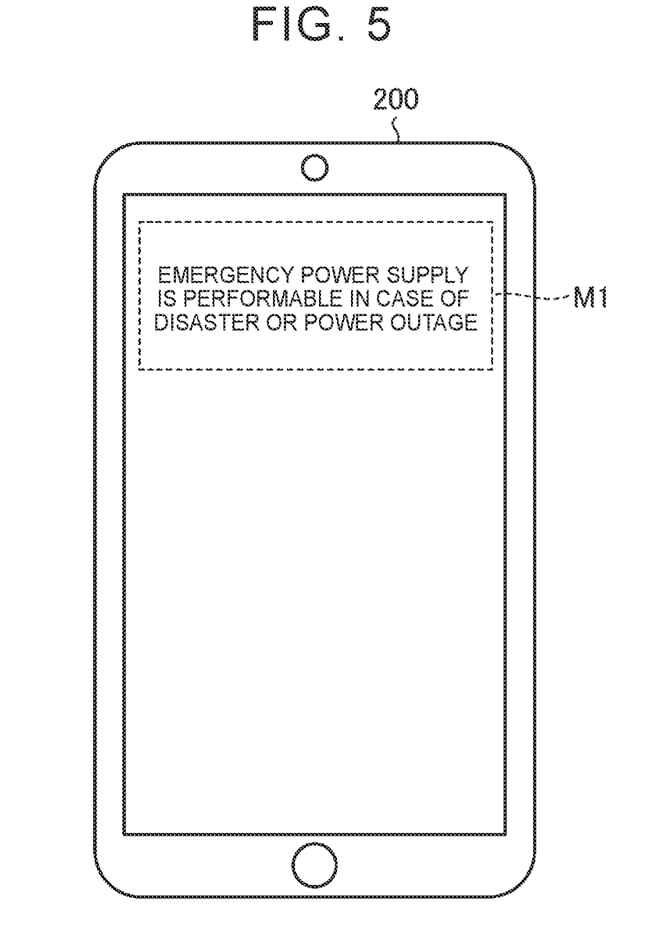
FIG. 5 is a view illustrating one example of power supply information to be displayed on a communications device according to one embodiment.
Figure 6:
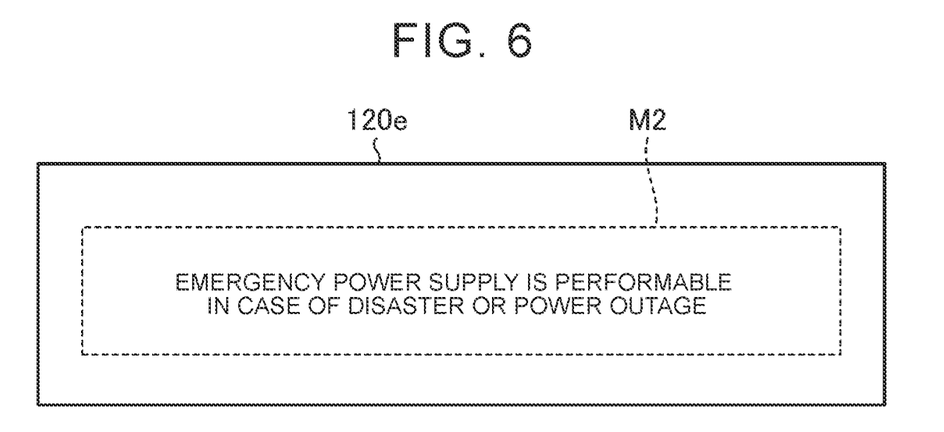
FIG. 6 is a view illustrating one example of power supply information to be displayed on a display portion of a vehicle according to one embodiment.

301. More specifically, as illustrated in FIG. 5, the output controlling portion 303*d* outputs, to the communications device 200 associated with the power supply vehicle 100A, power supply information including a message M1 indicating that emergency power supply is performable by the power supply vehicle 100A in which the occupant is riding in case of a disaster or power outage. Further, the output controlling portion 303*d* outputs the procedure information to the display portion 120*e* of the power supply vehicle 100A. In this case, as illustrated in FIG. 6, the output controlling portion 303*d* may output, to the power supply vehicle 100A, power supply information including a message M2 indicating that emergency power supply is performable by the power supply vehicle 100A in which the occupant is riding in case of a disaster or power outage, so that the message M2 is displayed on the display portion 120*e*. Hereby, the occupant can grasp that power supply is performable by his or her vehicle.

Figure 7:
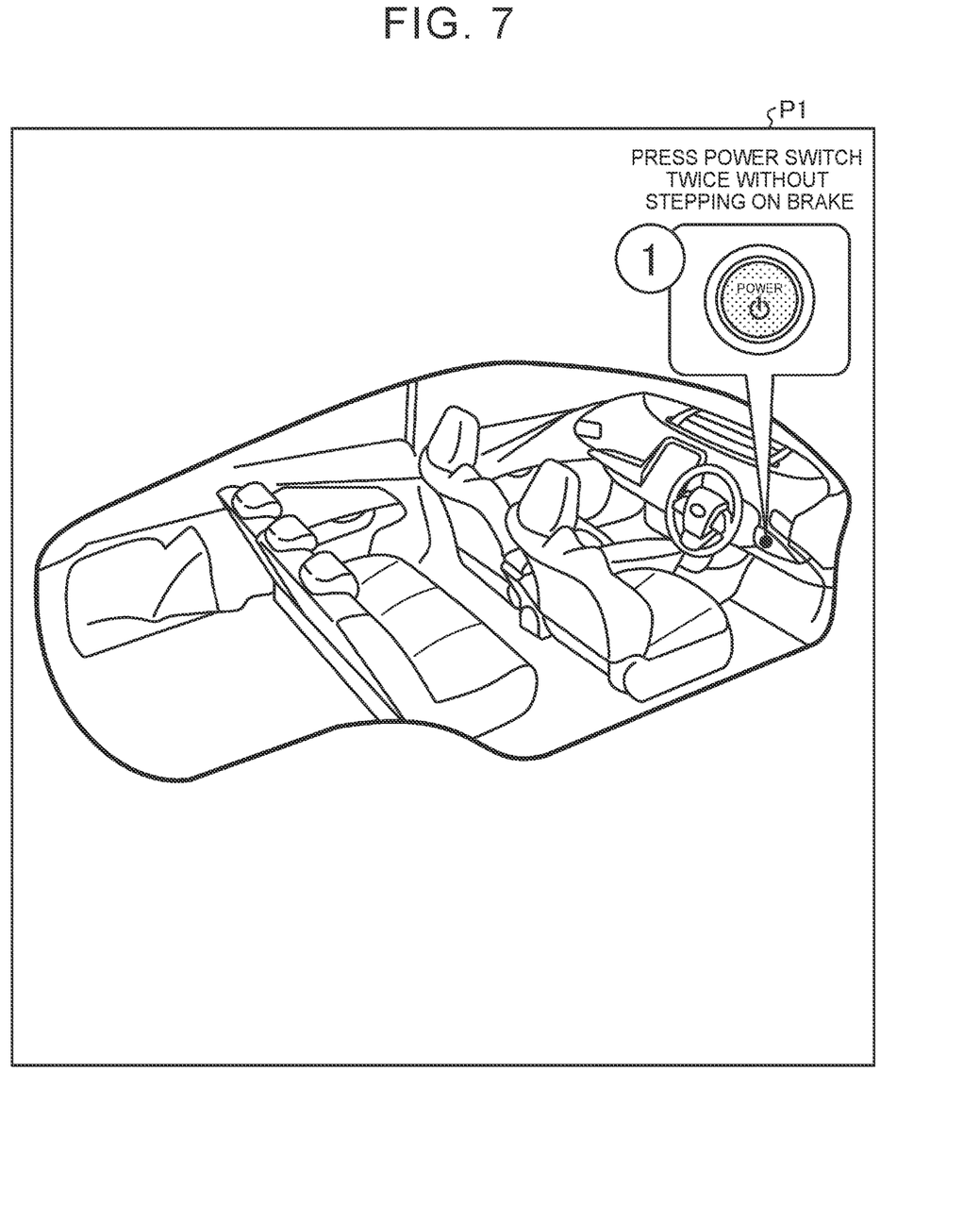
FIG. 7 is a view illustrating one example of procedure information to be displayed on the display portion of the vehicle according to one embodiment.
Figure 8:
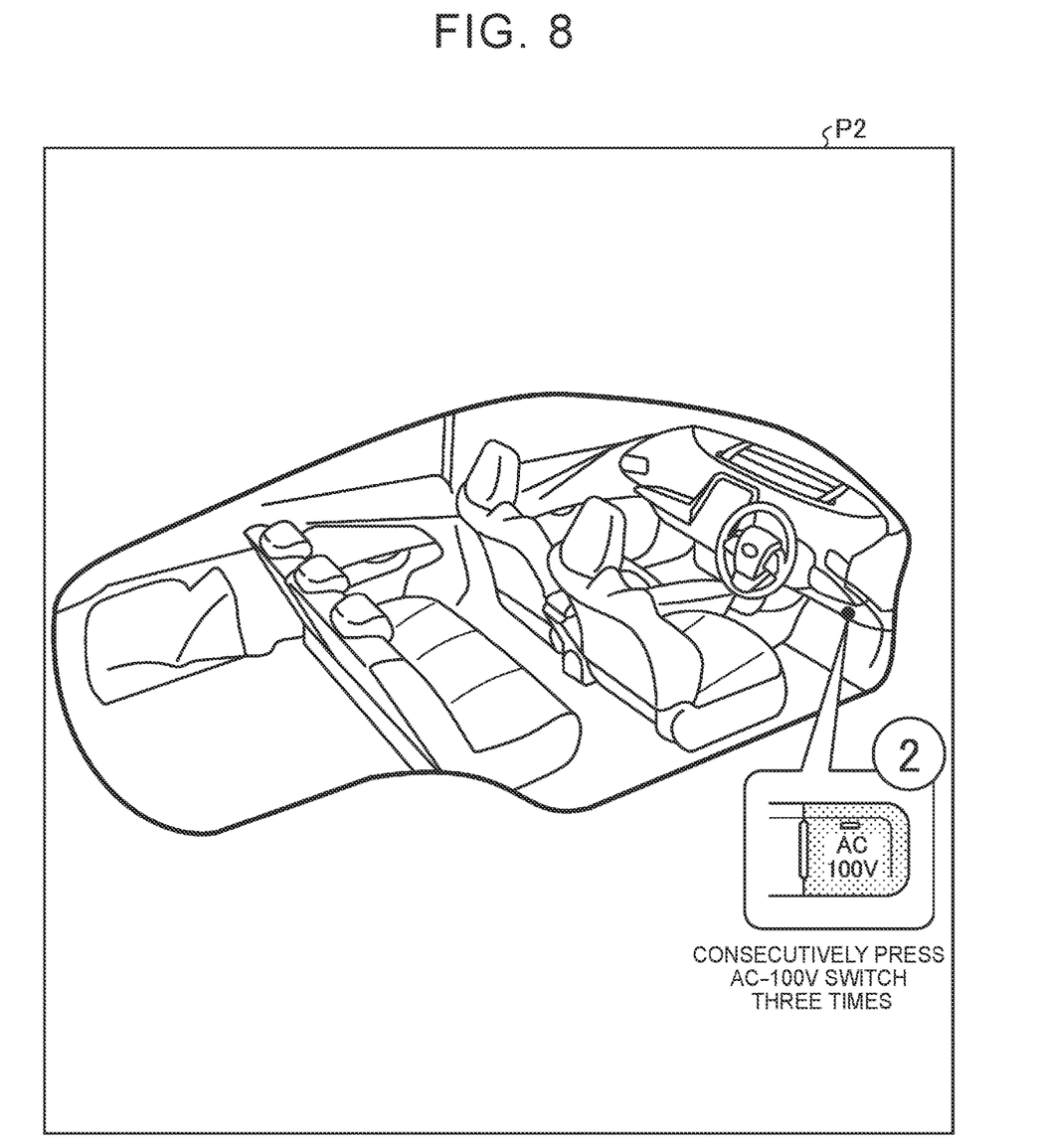
FIG. 8 is a view illustrating one example of the procedure information to be displayed on the display portion of the vehicle according to one embodiment.
Figure 9:
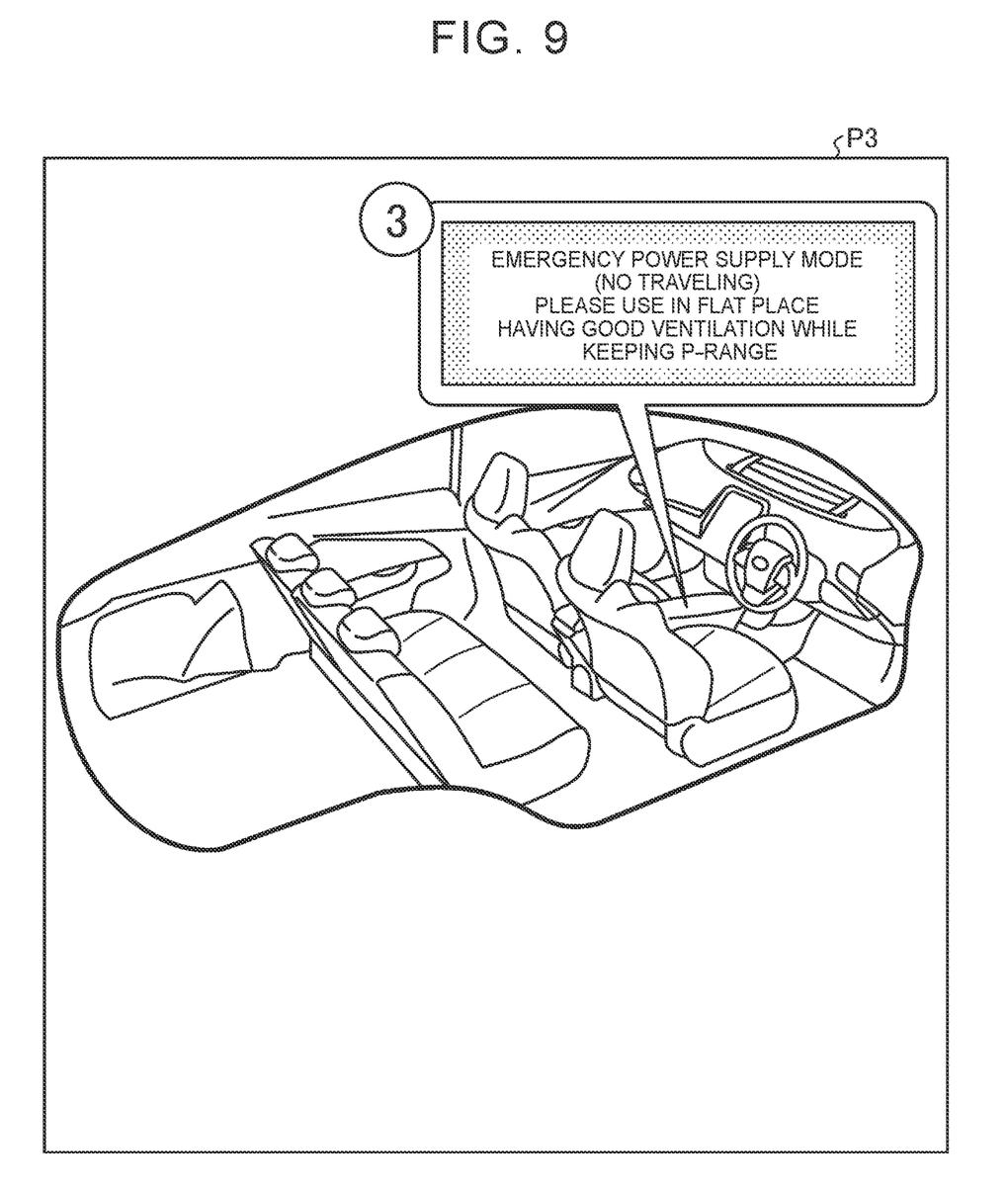
FIG. 9 is a view illustrating one example of the procedure information to be displayed on the display portion of the vehicle according to one embodiment.
Figure 10:
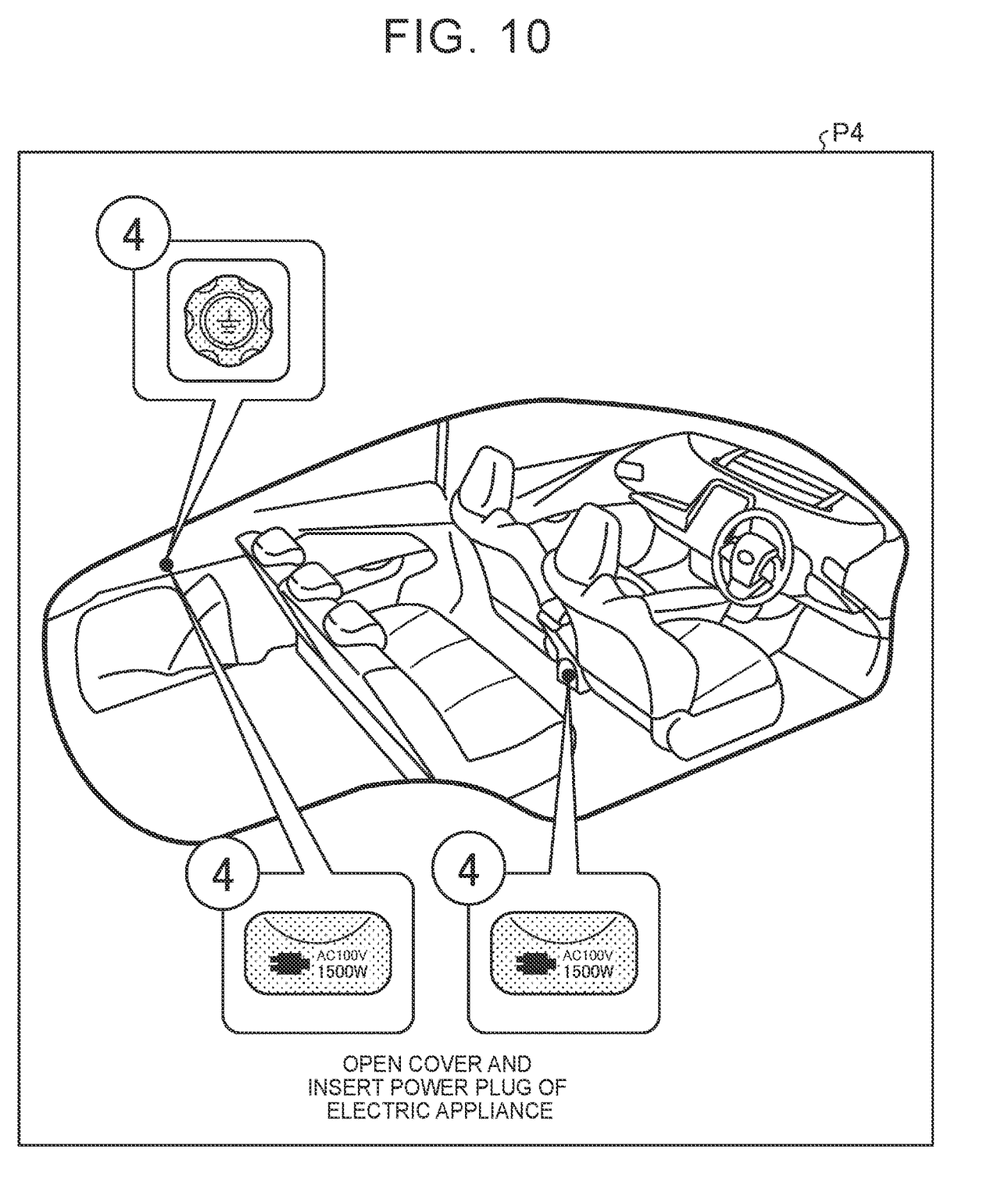
FIG. 10 is a view illustrating one example of the procedure information to be displayed on the display portion of the vehicle according to one embodiment.

Subsequently, the transmission controlling portion 303*e* transmits the procedure information indicating the procedure of the power supply method in response to an operation input by the occupant of the power supply vehicle 100A, via the network NW and the communication portion 301 (step S106). More specifically, first, as illustrated in FIG. 7, the transmission controlling portion 303*e* outputs a procedure image P1 to the display portion 120*e* so that the procedure image P1 is displayed on the display portion 120*e*. The procedure image P1 is to cause the occupant to press a power switch twice without stepping on a brake pedal. Subsequently, as illustrated in FIG. 8, in a case where the occupant presses down the power switch twice, the transmission controlling portion 303*e* outputs a procedure image P2 to the display portion 120*e* so that the procedure image P2 is displayed on the display portion 120*e*. The procedure image P2 is to cause the occupant to press an AC-100V switch three times consecutively. After that, as illustrated in FIG. 9, in a case where the occupant presses down the AC-100V switch three times consecutively, the transmission controlling portion 303*e* outputs a notice for power supply and a procedure image P3 to the display portion 120*e* so that the notice and the procedure image P3 are displayed on the display portion 120*e*. The procedure image P3 is to cause the occupant to shift a shift lever to a P-range. In this case, the transmission controlling portion 303*e* may cause the audio output portion 120*f* to output an audio notice for power supply. Finally, as illustrated in FIG. 10, in a case where the occupant shifts the shift lever to the P-range, the transmission controlling portion 303*e* outputs a procedure image P4 to the display portion 120*e* so that the procedure image P4 is displayed on the display portion 120*e*. The procedure image P4 indicates the position of a power plug necessary to use an electric appliance and an unlocking method of the power plug. Hereby, even in a case where the occupant does not know the power supply method by use of the power supply vehicle 100A, the occupant can perform power supply from the power supply vehicle 100A by operating in accordance with the procedure images P1 to P4. After step S106, the support server 300 ends this process.

In step S107, the acquisition portion 303*a* acquires respective pieces of position information on a plurality of communications devices 200 positioned in a region around the power supply vehicle 100A, via the network NW and the communication portion 301.

Subsequently, the determination portion 303*c* determines whether or not there is a communications device 200 different from the communications device 200 associated with the power supply vehicle 100A and owned by an unrelated person within a predetermined range (e.g., 1 km×1 km) from the power supply vehicle 100A (step S108). In a case where the determination portion 303*c* determines that there is a communications device 200 different from the communications device 200 associated with the power supply vehicle 100A and owned by an unrelated person within the predetermined range (e.g., 1 km×1 km) from the power supply vehicle 100A (step S108: Yes), the support server 300 shifts to step S109 (described later). In the meantime, in a case where the determination portion 303*c* determines that there is no communications device 200 different from the communications device 200 associated with the power supply vehicle 100A and owned by an unrelated person within the predetermined range (e.g., 1 km×1 km) from the power supply vehicle 100A (step S108: No), the support server 300 shifts to step S110 (described later).

In step S109, the output controlling portion 303*d* outputs power supply information indicating that the power supply vehicle 100A is in a power-suppliable state, to the communications device 200 positioned within the predetermined range from the power supply vehicle 100A and owned by the unrelated person via the network NW and the communication portion 301. In this case, the output controlling portion 303*d* may output the power supply information together with position information on the power supply vehicle 100A. Hereby, the unrelated person can notice the presence of the power supply vehicle 100A. After step S109, the support server 300 ends this process.

In step S110, the output controlling portion 303*d* outputs, to the display portion 120*e* via the network NW and the communication portion 301, the power supply information (see FIG. 6) indicating that the power supply vehicle 100A is in a power-suppliable state and procedure information indicative of the procedure of the power supply method.

Subsequently, the transmission controlling portion 303*e* transmits the procedure information (see FIGS. 7 to 10) indicating the procedure of the power supply method in response to operations input by the occupant of the power supply vehicle 100A via the network NW and the communication portion 301 (step S111). After step S111, the support server 300 ends this process.

In one embodiment described above, the acquisition portion 303*a* acquires respective pieces of vehicle information on a plurality of vehicles 100 present in a power outage area, and the specifying portion 303*b* specifies a power supply vehicle 100A by which power supply is performable, from among the vehicles 100 based on the respective pieces of vehicle information on the vehicles 100. The output controlling portion 303*d* outputs, to the power supply vehicle 100A, power supply information indicating that power supply is performable. Hereby, the occupant of the power supply vehicle 100A can grasp that power supply is performable by his or her own vehicle.

Further, in one embodiment, the output controlling portion 303*d* further outputs procedure information indicative of the procedure of the power supply method by use of the power supply vehicle 100A. Hereby, the occupant of the power supply vehicle 100A can easily grasp the power supply method by use of his or her own vehicle.

Further, in one embodiment, the transmission controlling portion 303*e* transmits the procedure information in accordance with procedure steps of the power supply method. Hereby, the occupant of the power supply vehicle 100A can perform the power supply method by following each of the procedure steps, so that power supply from the power supply vehicle 100A can be surely performed.

Further, in one embodiment, the output controlling portion 303d outputs power supply information to the communications device 200 associated with the power supply vehicle 100A or the display portion 120e of the power supply vehicle 100A. Hereby, the occupant of the power supply vehicle 100A can intuitively grasp that power supply is performable by his or her own vehicle.

Further, in one embodiment, the determination portion 303c determines whether or not wireless communication is established between the power supply vehicle 100A and the communications device 200 associated with the power supply vehicle 100A. In a case where the determination portion 303c determines that wireless communication is established between the power supply vehicle 100A and the communications device 200 associated with the power supply vehicle 100A, the output controlling portion 303d outputs power supply information to the communications device 200 associated with the power supply vehicle 100A. In the meantime, in a case where the determination portion 303c determines that wireless communication is established between the power supply vehicle 100A and the communications device 200 associated with the power supply vehicle 100A, the output controlling portion 303d outputs power supply information to the display portion 120e. Hereby, since simple power supply information is displayed on the communications device 200, the occupant of the power supply vehicle 100A can intuitively grasp that power supply is performable by his or her own vehicle, based on the power supply information displayed on the communications device 200.

Further, in one embodiment, the output controlling portion 303d outputs power supply information to the communications device 200 associated with the power supply vehicle 100A and outputs procedure information to the display portion 120e of the power supply vehicle 100A. Hereby, since simple power supply information is displayed on the communications device 200 and the procedure information is displayed on the display portion 120e, the occupant of the power supply vehicle 100A can intuitively grasp that power supply is performable by his or her own vehicle, based on the power supply information displayed on the communications device 200, and further, the occupant can perform power supply by use of the power supply vehicle 100A by checking the procedure information displayed on the display portion 120e.

Further, in one embodiment, the acquisition portion 303a acquires position information on the power supply vehicle 100A, and the output controlling portion 303d outputs the position information on the power supply vehicle 100A and power supply information to a communications device present within a predetermined range from the power supply vehicle 100A. The communications device is different from the communications device 200 associated with the power supply vehicle 100A and is owned by an unrelated person. Hereby, the person positioned near the power supply vehicle 100A can notice the presence of the power supply vehicle 100A.

Note that, in one embodiment, the functions of the acquisition portion 303a, the specifying portion 303b, the output controlling portion 303d, and the transmission controlling portion 303e included in the controlling portion 303 of the support server 300 may be provided in the ECU 122 of the vehicle 100. In this case, in a case where the ECU 122 receives, from an external server, power outage information based on position information on the vehicle 100, the ECU 122 may output, to the display portion 120e, power supply information indicating that power supply is performable by the vehicle 100. It is needless to say that the ECU 122 may output, to the communications device 200 associated with the vehicle 100, the power supply information indicating that power supply is performable by the vehicle 100. Further, the ECU 122 may output, to the display portion 120e, procedure information indicative of the procedure of the power supply method. Furthermore, the ECU 122 may transmit the procedure information in response to operations input by the occupant. Hereby, the occupant can grasp that his or her vehicle has a power supply function, and the occupant can intuitively grasp the procedure of the power supply method.

Further, one embodiment deals with an example in which the output controlling portion 303d outputs the procedure information on the power supply method in case of emergency power supply. However, the present disclosure is not limited to this. For example, the output controlling portion 303d may output procedure information indicative of the procedure of a usage method of an electric appliance at the time of normal use. Naturally, the output controlling portion 303d may output procedure information indicative of the procedure of a usage method of an AC external power supply system (vehicle power collector) at the time of normal use.

Further, in one embodiment, the "portion" mentioned above can be regarded as a "circuit" or the like. For example, the controlling portion can be regarded as a control circuit.

Further, a program to be executed by the disaster support system according to one embodiment is provided by being recorded in a recording medium (storage medium) readable by a computer, e.g., a CD-ROM, a flexible disk (FD), a CD-R, a digital versatile disk (DVD), a USB medium, or a flash memory, as file data in an installable or executable manner.

Further, the program to be executed by the disaster support system according to one embodiment may be stored in a computer connected to a network such as the Internet and may be provided by downloading via the network.

Note that, in the description about the flowcharts in the present specification, the context of processes of steps is exhibited by use of expressions such as "first," "after that," and "subsequently." However, the order of processes necessary to carry out the embodiments is not determined uniquely by those expressions. That is, the order of the processes in the flowcharts described in the present specification can be changed within a consistent range.

Further effects and modifications can be easily derived by a person skilled in the art. A wider variety of aspects of the disclosure are not limited to specific details and representative embodiments expressed and described above. Accordingly, various changes can be made without departing from the spirit or scope of a general concept of the disclosure defined by attached claims and their equivalents.

What is claimed is:

1. A disaster support system comprising:
   a plurality of vehicles, each of the plurality of vehicles including a display, a battery and an inlet receptacle through which electrical power can be supplied to the battery from outside of the vehicle and through which electrical power can be supplied from the battery to an external electric device located outside of the vehicle; and
   a support server communicable with the plurality of vehicles via a network, the support server including a processor configured to:
   acquire respective pieces of vehicle information about the plurality of vehicles present in a power outage area;

specify, from among the plurality of vehicles, a power supply vehicle by which power supply is performable, based on the respective pieces of vehicle information acquired about the plurality of vehicles;

output, to the power supply vehicle, power supply information indicating that power supply is performable by the power supply vehicle; and output, to the power supply vehicle, procedure information including a sequence of procedure images demonstrating how a user of the power supply vehicle is to cause the power supply vehicle to enter a mode in which the battery of the power supply vehicle is used as a power source to perform a power supply operation in which the power supply vehicle supplies power via at least the inlet receptacle to the external electric device, wherein the output of the procedure information includes:

(i) the processor transmitting, to the power supply vehicle, a first procedure image that the display of the power supply vehicle displays to the user, the first procedure image including a view of a portion of the power supply vehicle and text instructing the user to press a first power switch of the power supply vehicle twice without stepping on a brake pedal of the power supply vehicle, and (ii) in response to the user pressing the first power switch of the power supply vehicle twice without stepping on the brake pedal of the power supply vehicle, the processor transmitting, to the power supply vehicle, a second procedure image that the display of the power supply vehicle displays to the user, the second procedure image including a view of a portion of the power supply vehicle and text instructing the user of the power supply vehicle to press a second switch that is different from the first power switch three times consecutively, wherein the power supply vehicle enters the mode in which the battery of the power supply vehicle is used as the power source to perform the power supply operation in which the power supply vehicle supplies power via at least the inlet receptacle to the external electric device upon the user completing all instructions provided in the sequence of procedure images.

2. The disaster support system according to claim 1, wherein the processor outputs the power supply information to a communications device associated with the power supply vehicle or the display included in the power supply vehicle.

3. The disaster support system according to claim 2, wherein:

the processor determines whether or not wireless communication is established between the power supply vehicle and the communications device;

in a case where the processor determines that the wireless communication is established, the processor outputs the power supply information to the communications device; and in a case where the processor determines that the wireless communication is not established, the processor outputs the power supply information to the display.

4. The disaster support system according to claim 3, wherein:

the processor outputs the power supply information to the communications device; and the processor outputs the procedure information to the power supply vehicle.

5. The disaster support system according to claim 1, wherein:

the processor acquires position information on the power supply vehicle; and the processor outputs the position information and the power supply information to a device placed within a predetermined range from the power supply vehicle.

6. A disaster support method in which a support server communicates with a plurality of vehicles via a network, each of the plurality of vehicles including a display, a battery and an inlet receptacle through which electrical power can be supplied to the battery from outside of the vehicle and through which electrical power can be supplied from the battery to an external electric device located outside of the vehicle, the method comprising:

acquiring, by a processor of the support server, respective pieces of vehicle information about the plurality of vehicles present in a power outage area;

specifying, by the processor of the support server, from among the plurality of vehicles, a power supply vehicle by which power supply is performable, based on the respective pieces of vehicle information acquired about the plurality of vehicles;

the support server outputting, to the power supply vehicle, power supply information indicating that power supply is performable by the power supply vehicle; and the support server outputting, to the power supply vehicle, procedure information including a sequence of procedure images demonstrating how a user of the power supply vehicle is to cause the power supply vehicle to enter a mode in which the battery of the power supply vehicle is used as a power source to perform a power supply operation in which the power supply vehicle supplies power via at least the inlet receptacle to the external electric device, the outputting of the procedure information including:

(i) the processor transmitting, to the power supply vehicle, a first procedure image that the display of the power supply vehicle displays to the user, the first procedure image including a view of a portion of the power supply vehicle and text instructing the user to press a first power switch of the power supply vehicle twice without stepping on a brake pedal of the power supply vehicle, and (ii) in response to the user pressing the first power switch of the power supply vehicle twice without stepping on the brake pedal of the power supply vehicle, the processor transmitting, to the power supply vehicle, a second procedure image that the display of the power supply vehicle displays to the user, the second procedure image including a view of a portion of the power supply vehicle and text instructing the user of the power supply vehicle to press a second switch that is different from the first power switch three times consecutively, wherein the power supply vehicle enters the mode in which the battery of the power supply vehicle is used as the power source to perform the power supply operation in which the power supply vehicle supplies power via at least the inlet receptacle to the external electric device upon the user completing all instructions provided in the sequence of procedure images.

* * * * *